United States Patent
Olsen et al.

(10) Patent No.: US 10,407,030 B2
(45) Date of Patent: Sep. 10, 2019

(54) FILLER NECK FOR AN AUTOMOTIVE FLUID CONTAINER

(75) Inventors: Robert F. Olsen, Monroe, MI (US); James A. Papke, Temperance, MI (US); John D. Law, Dundee, MI (US); Earl W. Larrow, Erie, MI (US)

(73) Assignee: Toledo Molding & Die, Inc., Toledo, OH (US)

( * ) Notice: Subject to any disclaimer, the term of this patent is extended or adjusted under 35 U.S.C. 154(b) by 0 days.

(21) Appl. No.: 14/363,381

(22) PCT Filed: Dec. 7, 2011

(86) PCT No.: PCT/US2011/063670
§ 371 (c)(1),
(2), (4) Date: Jun. 6, 2014

(87) PCT Pub. No.: WO2013/085503
PCT Pub. Date: Jun. 13, 2013

(65) Prior Publication Data
US 2014/0319134 A1    Oct. 30, 2014

(51) Int. Cl.
*B60S 1/50* (2006.01)
*B60K 15/035* (2006.01)
*B60K 15/04* (2006.01)

(52) U.S. Cl.
CPC .............. *B60S 1/50* (2013.01); *B60K 15/035* (2013.01); *B60K 15/04* (2013.01); *B60K 2015/03552* (2013.01)

(58) Field of Classification Search
CPC .......... B60S 1/50; B60K 15/035; B60K 15/04
(Continued)

(56) References Cited

U.S. PATENT DOCUMENTS 227,697 A * 5/1880 Massey .................. B65D 47/06
                                                141/309
235,123 A * 12/1880 Bovey ....................... F17C 5/06
                                                141/18

(Continued)

FOREIGN PATENT DOCUMENTS

| CA | 1299524 C | 4/1992 |
| CN | 1139414 A | 1/1997 |
| CN | 101346532 A | 1/2009 |

OTHER PUBLICATIONS

PCT International Search Report and the Written Opinion, PCT/US2011/063670, filed Dec. 7, 2011, dated Apr. 3, 2012.
(Continued)

*Primary Examiner* — Paul R Durand
*Assistant Examiner* — Randall A Gruby
(74) *Attorney, Agent, or Firm* — McHale & Slavin, P.A.

(57) ABSTRACT

A filler neck for use with an automotive fluid container having a body that includes an opening in communication with a reservoir and a fluid passageway for allowing fluid to flow through the body into the container. The reservoir and the fluid passageway are configured to regulate fluid flow through the body. The reservoir has a fill limit section. The body further includes an air passageway, an air channel and an exhaust port for allowing displaced air from the container to flow through the body. The air passageway, the air channel and the exhaust port are integrally formed with the body. The exhaust port is positioned above the fill limit section to maximize air exhaust and minimize fluid leakage from the body.

11 Claims, 7 Drawing Sheets

(58) Field of Classification Search
USPC .................. 141/350; 220/86.1–86.2
See application file for complete search history.

(56) References Cited

U.S. PATENT DOCUMENTS

| | | | | |
|---|---|---|---|---|
| 374,875 A * | 12/1887 | Lyman | B01D 23/28 | 141/297 |
| 1,676,986 A * | 7/1928 | Hilford | B67C 11/02 | 141/300 |
| 2,139,476 A * | 12/1938 | Townsend | H01M 2/362 | 137/261 |
| 2,391,040 A * | 12/1945 | Scully | B67D 7/32 | 116/109 |
| 2,399,167 A * | 4/1946 | Chouinard | G01F 23/0015 | 116/227 |
| 2,841,313 A * | 7/1958 | Beall, Jr. | B65D 47/248 | 222/479 |
| 2,861,604 A * | 11/1958 | Whitmire | B65B 1/18 | 141/285 |
| 2,910,097 A * | 10/1959 | Madsen | G01F 23/0015 | 141/96 |
| 2,992,761 A * | 7/1961 | Sommers, Sr. | E02D 7/24 | 222/479 |
| 3,187,936 A * | 6/1965 | Downing | B60K 15/04 | 138/111 |
| 3,477,611 A * | 11/1969 | Niles | B60K 15/03 | 220/202 |
| 3,645,301 A * | 2/1972 | Lau | B65B 1/18 | 141/310 |
| 3,838,713 A | 10/1974 | Tubbs | | |
| 3,872,900 A * | 3/1975 | Gotz | B60K 15/04 | 141/392 |
| 3,901,417 A * | 8/1975 | Schiemann | B65D 1/20 | 222/479 |
| 4,202,386 A * | 5/1980 | Orr | B67C 11/00 | 141/300 |
| 4,441,533 A * | 4/1984 | Snyder | B67D 7/48 | 141/225 |
| 4,450,880 A * | 5/1984 | Scheurenbrand | B60K 15/04 | 141/285 |
| 4,494,585 A | 1/1985 | Waldecker | | |
| 4,588,111 A * | 5/1986 | Hestehave | B65D 25/48 | 220/86.1 |
| 4,630,749 A * | 12/1986 | Armstrong | B67D 7/54 | 141/59 |
| 4,635,813 A * | 1/1987 | Peickert | B60K 15/04 | 138/40 |
| 4,651,889 A * | 3/1987 | Uranishi | B60K 15/04 | 123/519 |
| 4,690,293 A * | 9/1987 | Uranishi | B60K 15/0406 | 220/288 |
| 4,701,198 A * | 10/1987 | Uranishi | B01D 19/0063 | 123/519 |
| 4,722,454 A * | 2/1988 | Fischer | B60K 15/04 | 137/587 |
| 4,759,458 A | 7/1988 | Fischer | | |
| 4,809,863 A * | 3/1989 | Woodcock | B60K 15/03504 | 220/746 |
| 4,813,453 A * | 3/1989 | Jenkins | B60K 15/03504 | 137/588 |
| 4,834,151 A * | 5/1989 | Law | B65D 47/283 | 141/198 |
| 4,836,835 A * | 6/1989 | Harris | B60K 15/04 | 141/286 |
| 4,869,283 A * | 9/1989 | Oeffling | B60K 15/03519 | 137/43 |
| 4,893,643 A * | 1/1990 | Gifford | B60K 15/04 | 137/202 |
| 4,958,655 A * | 9/1990 | Danek | B60K 15/035 | 123/516 |
| 4,976,297 A * | 12/1990 | Peckels | B67C 11/02 | 116/109 |
| 4,997,013 A * | 3/1991 | Peckels | B67C 11/02 | 116/109 |
| 5,000,333 A | 3/1991 | Petrelli | | |
| 5,127,118 A * | 7/1992 | Johenning | A47C 27/085 | 141/285 |
| 5,171,044 A * | 12/1992 | Umezawa | B29C 49/20 | 138/111 |
| 5,263,511 A * | 11/1993 | Ohasi | B60K 15/03519 | 137/588 |
| 5,275,213 A * | 1/1994 | Perkins | B60K 15/035 | 141/286 |
| 5,327,946 A | 7/1994 | Perkins | | |
| 5,373,957 A * | 12/1994 | Gryc | B60K 15/04 | 137/202 |
| D360,612 S * | 7/1995 | Whitley, II | D12/197 | |
| 5,503,199 A * | 4/1996 | Whitley, II | B60K 15/04 | 141/286 |
| 5,819,796 A * | 10/1998 | Kunimitsu | B60K 15/03519 | 137/587 |
| 5,829,619 A * | 11/1998 | Gupta | B60K 15/04 | 141/45 |
| 5,839,489 A * | 11/1998 | Ganachaud | B60K 15/04 | 141/382 |
| 5,862,961 A * | 1/1999 | Motta | B67D 1/0832 | 137/212 |
| 6,044,517 A | 4/2000 | Zendler et al. | | |
| 6,155,464 A * | 12/2000 | Vachon | B67D 7/005 | 141/291 |
| 6,330,893 B1 * | 12/2001 | O'Connell | B60K 15/04 | 141/286 |
| 6,408,693 B1 * | 6/2002 | Drinkwater | G01F 23/02 | 141/95 |
| 6,478,058 B1 * | 11/2002 | Pears | B65D 25/48 | 141/255 |
| 6,508,275 B1 | 1/2003 | Sadr et al. | | |
| 6,588,459 B2 * | 7/2003 | O'Connell | B60K 15/04 | 141/286 |
| 7,017,629 B2 | 3/2006 | Winterling | | |
| 7,048,019 B2 * | 5/2006 | Pacitto, Jr. | B60K 15/04 | 141/286 |
| 7,086,548 B2 | 8/2006 | Bartlett | | |
| 7,096,892 B2 * | 8/2006 | Tawa | B67C 11/02 | 137/571 |
| 7,284,581 B2 * | 10/2007 | Steinweg | B67C 11/04 | 141/331 |
| 7,343,942 B2 * | 3/2008 | O'Connell | B60K 15/04 | 141/286 |
| 7,426,946 B2 | 9/2008 | Kim | | |
| 7,628,178 B2 * | 12/2009 | Ackermann | B60K 15/04 | 138/110 |
| 7,721,774 B2 | 5/2010 | Cook et al. | | |
| 8,127,807 B2 | 3/2012 | Ito et al. | | |
| 8,727,187 B2 * | 5/2014 | Magley, II | B65D 47/32 | 222/481.5 |
| 9,409,476 B2 * | 8/2016 | Randolph | B60K 15/0406 | |
| 9,428,044 B2 * | 8/2016 | Boecker | B60K 15/03504 | |
| 9,428,045 B2 * | 8/2016 | Felber | B60K 15/035 | |
| D766,719 S * | 9/2016 | Magley | D9/442 | |
| 9,649,930 B2 * | 5/2017 | Kato | B60K 15/04 | |
| 9,783,045 B2 * | 10/2017 | Aso | B60K 15/03504 | |
| 9,874,127 B2 * | 1/2018 | Ryoo | F01N 3/2066 | |
| 10,006,565 B2 * | 6/2018 | Kito | F16L 3/1016 | |
| 10,093,175 B2 * | 10/2018 | Kito | B60K 15/04 | |
| 2002/0100168 A1 | 8/2002 | Yoshida | B60K 15/04 | 29/890.14 |
| 2005/0016619 A1 * | 1/2005 | Winterling | B60S 1/50 | 141/2 |
| 2006/0180958 A1 * | 8/2006 | McClung | B29C 49/482 | 264/523 |
| 2007/0261752 A1 * | 11/2007 | McClung | B60K 15/03177 | 138/137 |
| 2007/0289664 A1 * | 12/2007 | Peterson | B60K 15/04 | 141/126 |
| 2015/0314677 A1 * | 11/2015 | Booth | B60K 15/04 | 220/562 |
| 2017/0050513 A1 * | 2/2017 | Hatanaka | B60K 15/035 | |

(56) References Cited

U.S. PATENT DOCUMENTS

2017/0203650 A1* 7/2017 Nakaya ................ B60K 15/035
2017/0259665 A1* 9/2017 Zhangsheng .......... B60K 15/04
2018/0334026 A1* 11/2018 Sekihara ................ B60K 15/04

OTHER PUBLICATIONS

Chinese Office Action, Application No. 201180075324.6, dated Apr. 23, 2015.

* cited by examiner

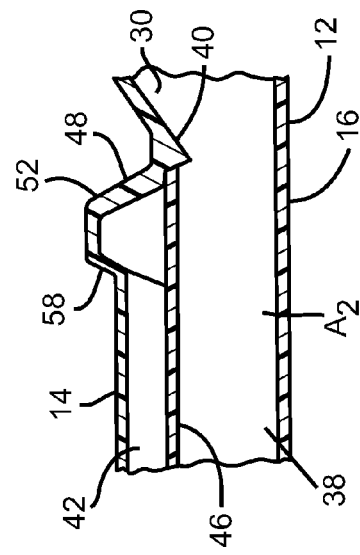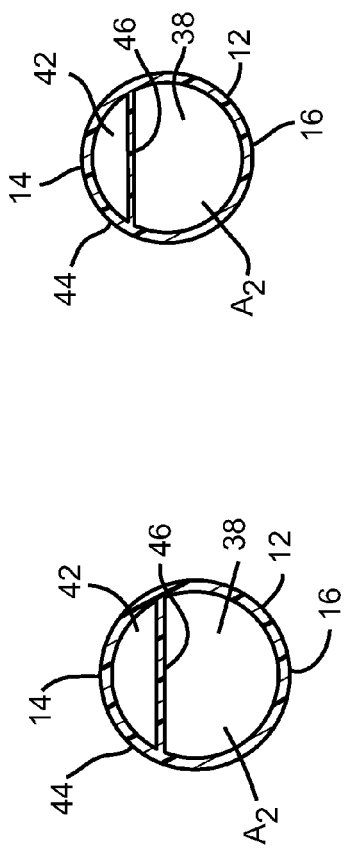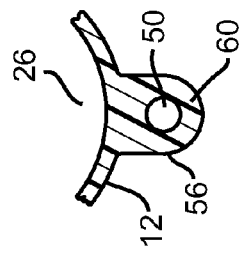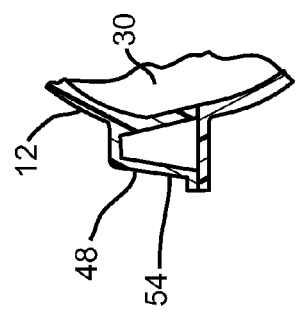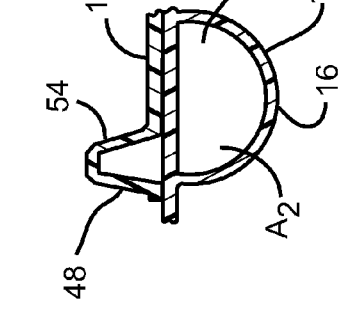

FILLER NECK FOR AN AUTOMOTIVE FLUID CONTAINER

TECHNICAL FIELD

The invention relates generally to filling devices for containers. More specifically, the invention is directed to filler necks for automotive fluid containers.

BACKGROUND OF THE INVENTION

In the past, automotive fluid containers, such as windshield washer fluid containers, were placed in engine compartments. This allowed for direct filling through openings in the tops of the containers without the need for air vents.

Due to space limitations in engine compartments, fluid containers have been positioned in other areas including spaces adjacent to fenders. This presents challenges to filling and venting these types of containers.

BRIEF SUMMARY OF THE INVENTION

In summary, the invention is a filler neck for use with an automotive fluid container having a body that includes an opening in communication with a reservoir and a fluid passageway for allowing fluid to flow through the body into the container. The reservoir and the fluid passageway are configured to regulate fluid flow through the body. The reservoir has a fill limit section. The body further includes an air passageway, an air channel and an exhaust port for allowing displaced air from the container to flow through the body. The air passageway, the air channel and the exhaust port are integrally formed with the body. The exhaust port is positioned above the fill limit section to maximize air exhaust and minimize fluid leakage from the body.

BRIEF DESCRIPTION OF THE DRAWINGS

FIG. 5 is a cross-sectional view taken along line 5-5 of FIG. 4;

FIG. 6 is a cross-sectional view taken along line 6-6 of FIG. 4;

FIG. 7 is a cross-sectional view taken along line 7-7 of FIG. 2;

FIG. 8 is a cross-sectional view taken along line 8-8 of FIG. 4;

FIG. 9 is a cross-sectional view taken along line 9-9 of FIG. 4;

FIG. 10 is a cross-sectional view taken along line 10-10 of FIG. 4;

DETAILED DESCRIPTION OF THE INVENTION

Figure 1:
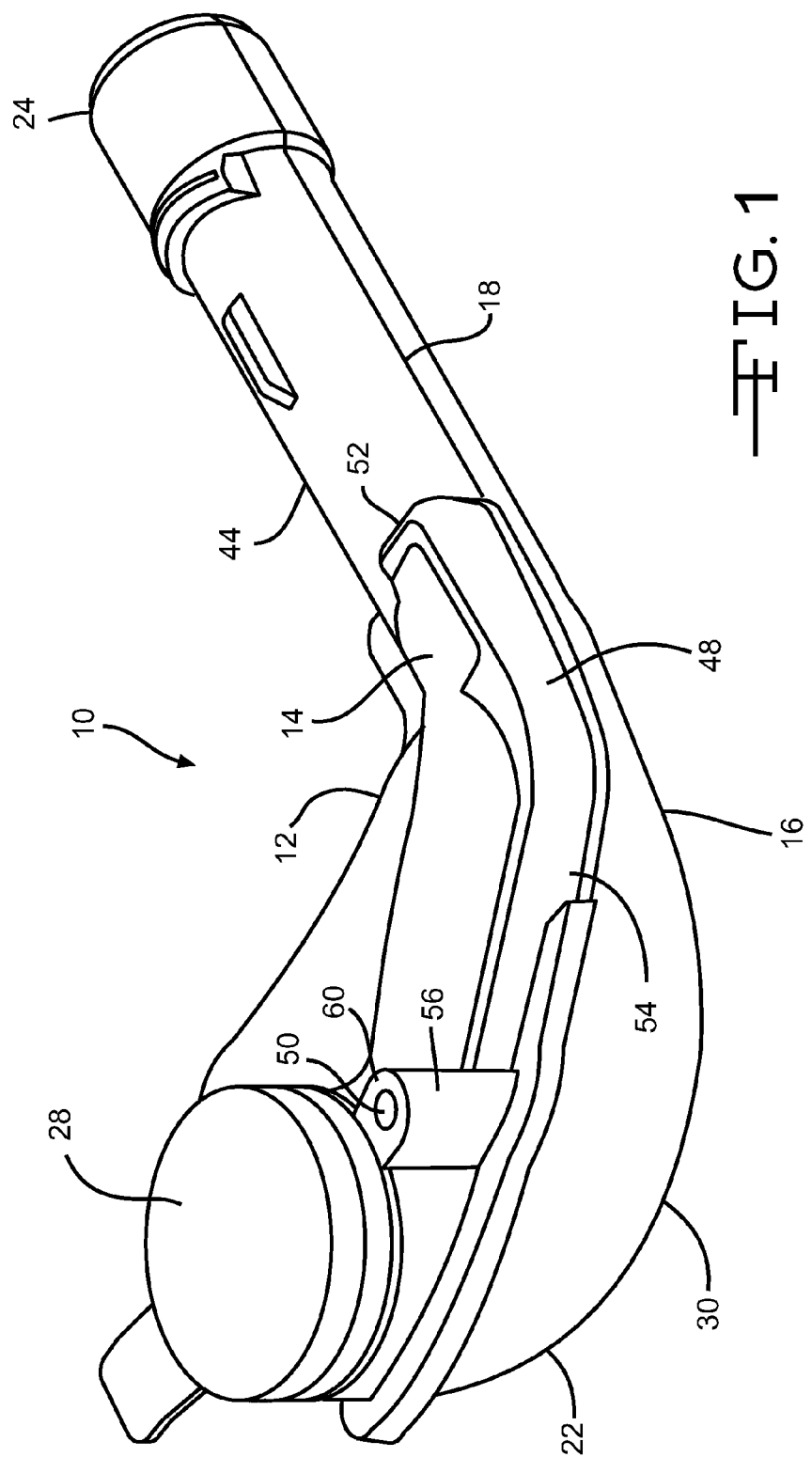
FIG. 1 is a first top perspective view of an embodiment of a filler neck for an automotive fluid container according to the invention.

Referring to the drawings, an embodiment of the filler neck for an automotive fluid container according to the invention is generally indicated by the reference number "10." As shown in FIGS. 1-4, the filler neck 10 has a body 12 including a top 14, a bottom 16, a first side 18, a second side 20, a first end 22 and a second end 24. The body 12 extends longitudinally between the first and second ends 22 and 24. The first end 22 is closed and the second end 24 is open.

Figure 2:
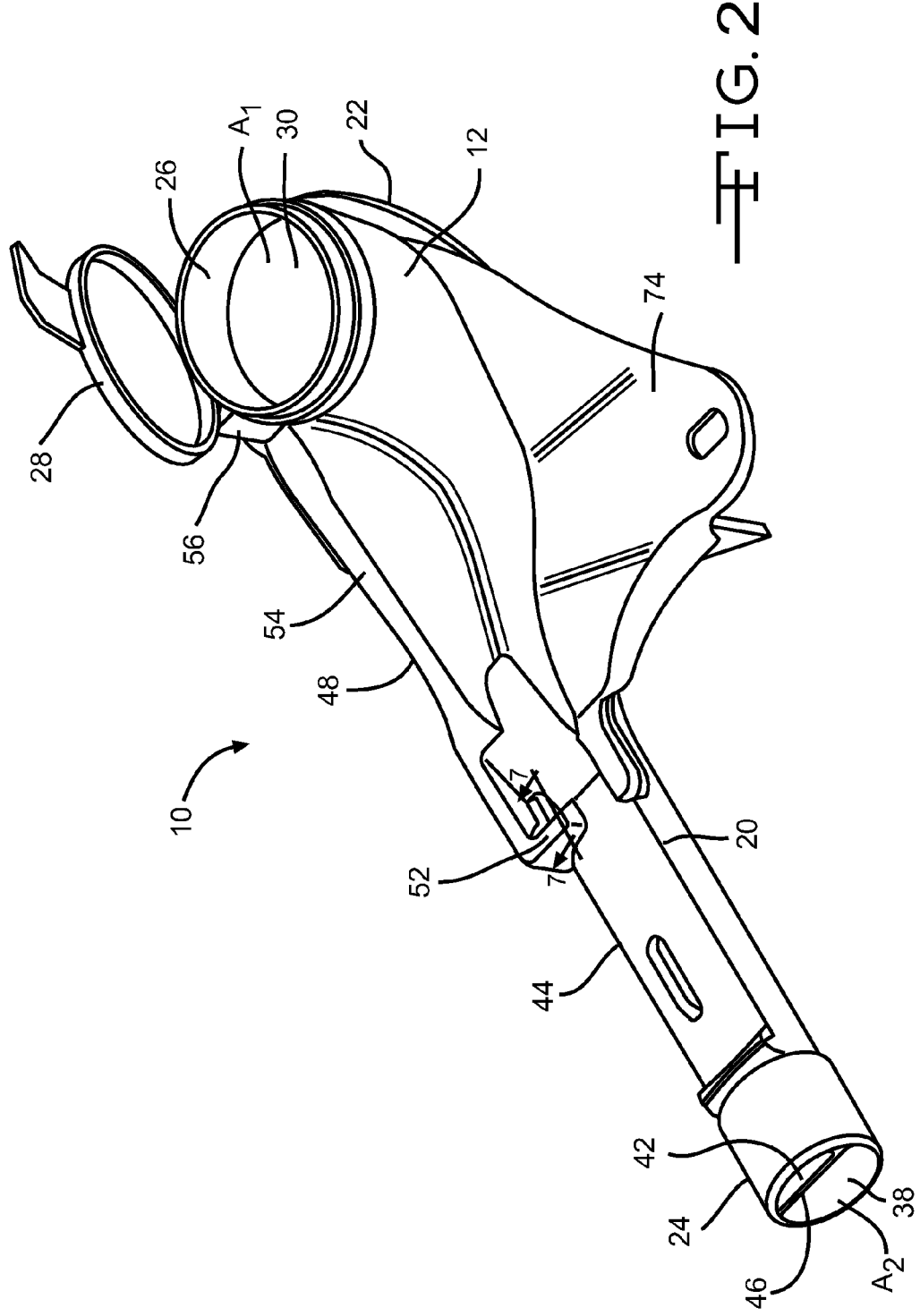
FIG. 2 is a second top perspective view thereof.
Figure 3:
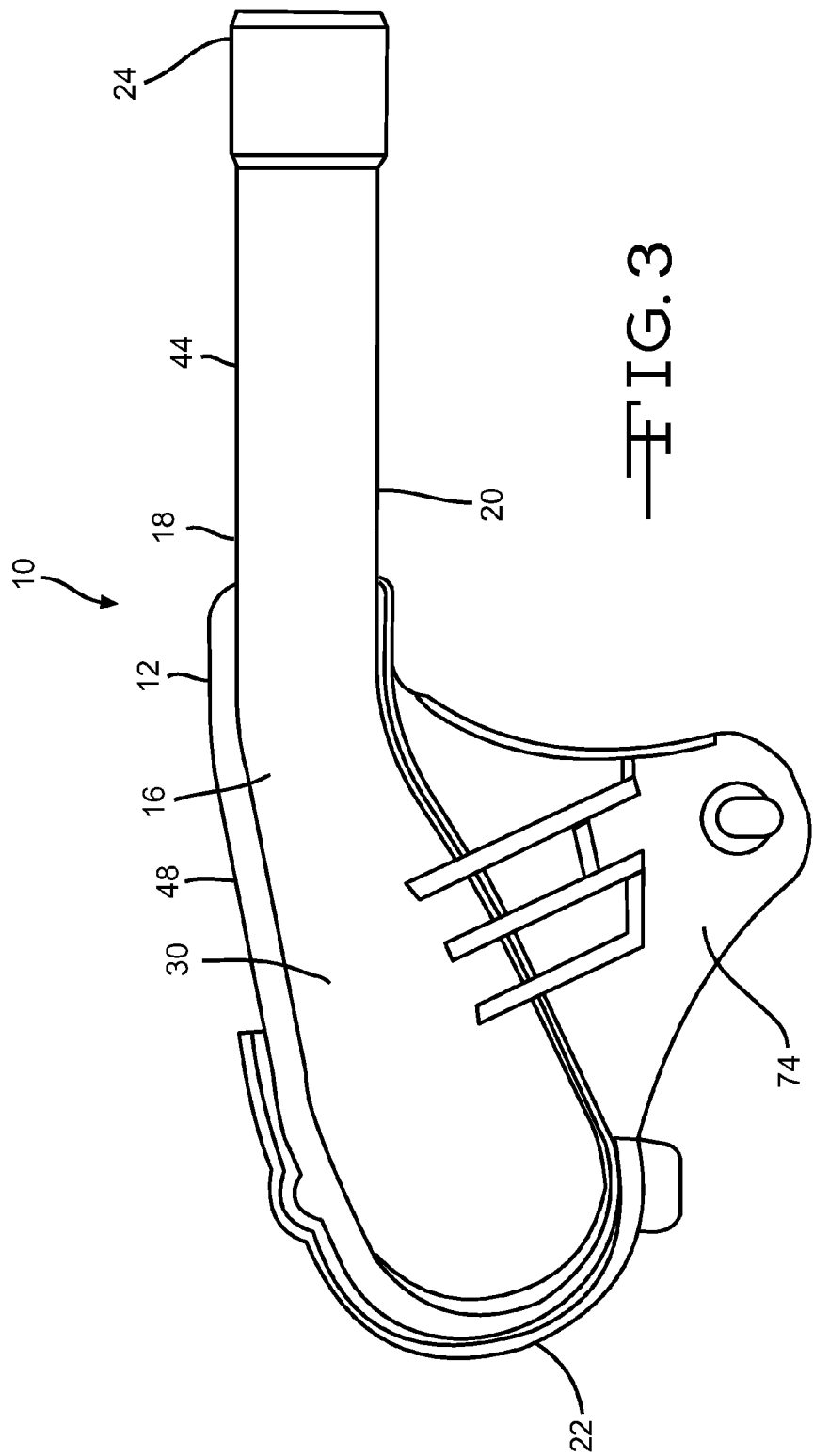
FIG. 3 is a bottom plan view thereof.
Figure 4:
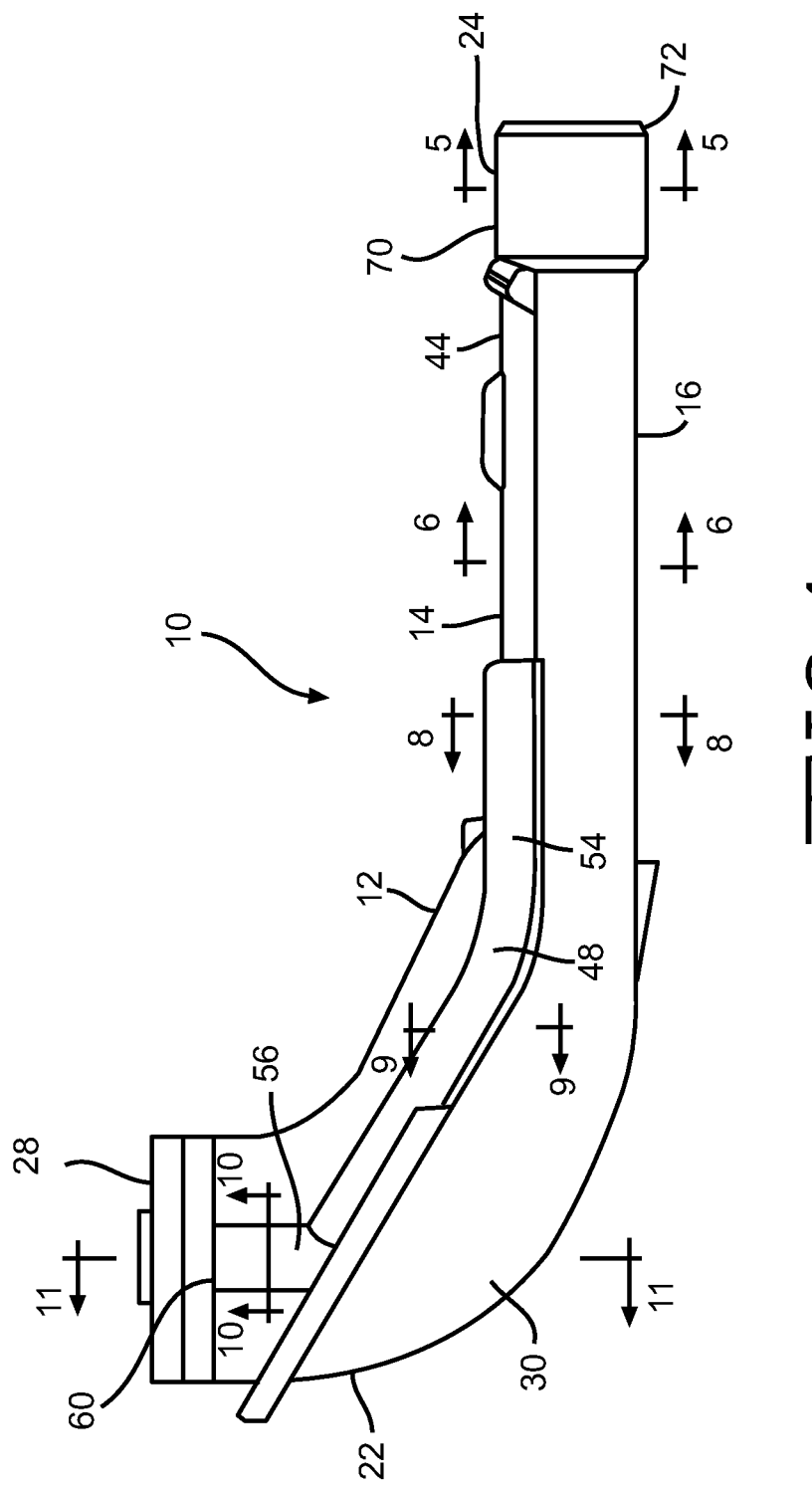
FIG. 4 is a side elevational view thereof.

Referring to FIGS. 1, 2 and 4, the body 12 has a generally circular opening 26 positioned on the top 14 at the first end 22. A cap 28 is positioned on the body 12 adjacent to the opening 26. The cap 28 is movable from a closed position, as shown in FIG. 1, to an open position, as shown in FIG. 2, to seal and unseal the opening 26.

Figure 11:
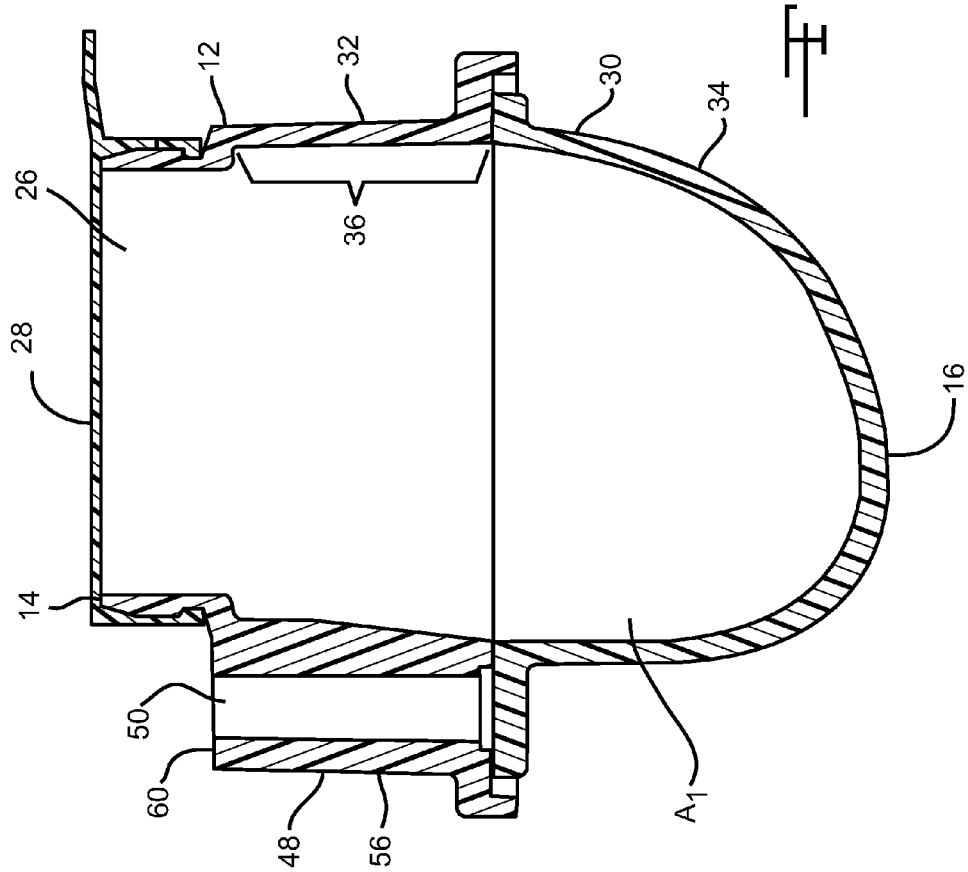
FIG. 11 is a cross-sectional view taken along line 11-11 of FIG. 4.

Referring to FIGS. 1, 2, 4, 8, 9 and 11, the opening 26 is in communication with a reservoir 30 positioned at the first end 22 for receiving a fluid, such as washer fluid. As shown in FIG. 11, the reservoir 30 has an upper portion 32 and a lower portion 34. A fill limit section 36 is positioned in the upper portion 32. Referring again to FIGS. 2, 4, 8, 9 and 11, the lower portion 34 of the reservoir 30 is in communication with a fluid passageway 38 that extends longitudinally from the reservoir 30 to the second end 24 along the bottom 16 of the body 12. This allows for fluid flow from the opening 26 to the second end 24. The reservoir 30 and the fluid passageway 38 are configured to regulate fluid flow through the body 12. In an embodiment, as shown in FIGS. 2, 6, 7 and 11, the area $A_1$ of the reservoir 30 is larger than the area $A_2$ of the fluid passageway 38 to regulate fluid flow through the body 12. In an embodiment as shown in FIG. 7, the body 12 has a downwardly extending barrier 40 positioned at the intersection of the reservoir 30 and the fluid passageway 38. The barrier 40 acts to guide the fluid from the reservoir 30 in a downward direction into the fluid passageway 38 to regulate fluid flow through the body 12. In an embodiment, the reservoir 30 and the fluid passageway 38 are configured to allow for a predetermined rate of fluid flow. For example, this flow rate is about 2 gallons (US)/minute (about 3.785 liters/minute).

As shown in FIGS. 1, 2 and 4-11, the body 12 has an air passageway 42 that extends longitudinally from the second end 24 along the top 14 of the body 12. In an embodiment, the body 12 has a tubular-shaped member 44 in which the fluid and air passageways 38 and 42 are positioned immediately adjacent to one another and separated by a dividing wall 46. The fluid passageway 38 is positioned below the air passageway 42. In this embodiment, the fluid and air passageways 38 and 42 have generally semi-circular cross sections as shown in FIG. 6.

Referring to FIGS. 1, 2, 4, and 7-11, the air passageway 42 is in communication with an air channel 48 that extends from the air passageway 42 to an exhaust port 50 that is positioned immediately adjacent to the opening 26. This allows for air flow from the second end 24 to the exhaust port 50. The air passageway 42, the air channel 48 and the exhaust port 50 are integrally formed on the body 12 to provide unitary construction for performance, strength and compactness. The air passageway 42 and the air channel 48 are configured to guide air flow through the body 12. In an embodiment, the air channel 48 creates a tortuous path for air flow. In an embodiment, the air channel 48 has a first segment 52 that extends along the top 14 toward the first side 18 in a generally perpendicular relationship with the air passageway 42. A second segment 54 extends along the first side 18 in a generally perpendicular relationship to the first segment 52. As shown in FIG. 4, the second segment 54 curves gradually upwardly along the first side 18. A third segment 56 is positioned on the first side 18 in a generally perpendicular relationship to the second segment 54. As shown in FIG. 7, the air channel 48 has a raised portion 58 that allows for air flow over any fluid that might enter the air channel 48 from the air passageway 42 during filling. As shown in FIGS. 4 and 11, the third segment 56 has a terminal end 60 that includes the exhaust port 50. The exhaust port 50 is positioned above the fill limit section 36 of the reservoir 30. Further, the exhaust port 50 is positioned above the fluid and air passageways 38 and 42. This maximizes air exhaust and minimizes fluid leakage during filling.

The body 12 and the cap 28 can be made from a variety of materials. In an embodiment, the body 12 and the cap 28 are made of a plastic material such as polypropylene for strength, durability and cost.

Figure 12:
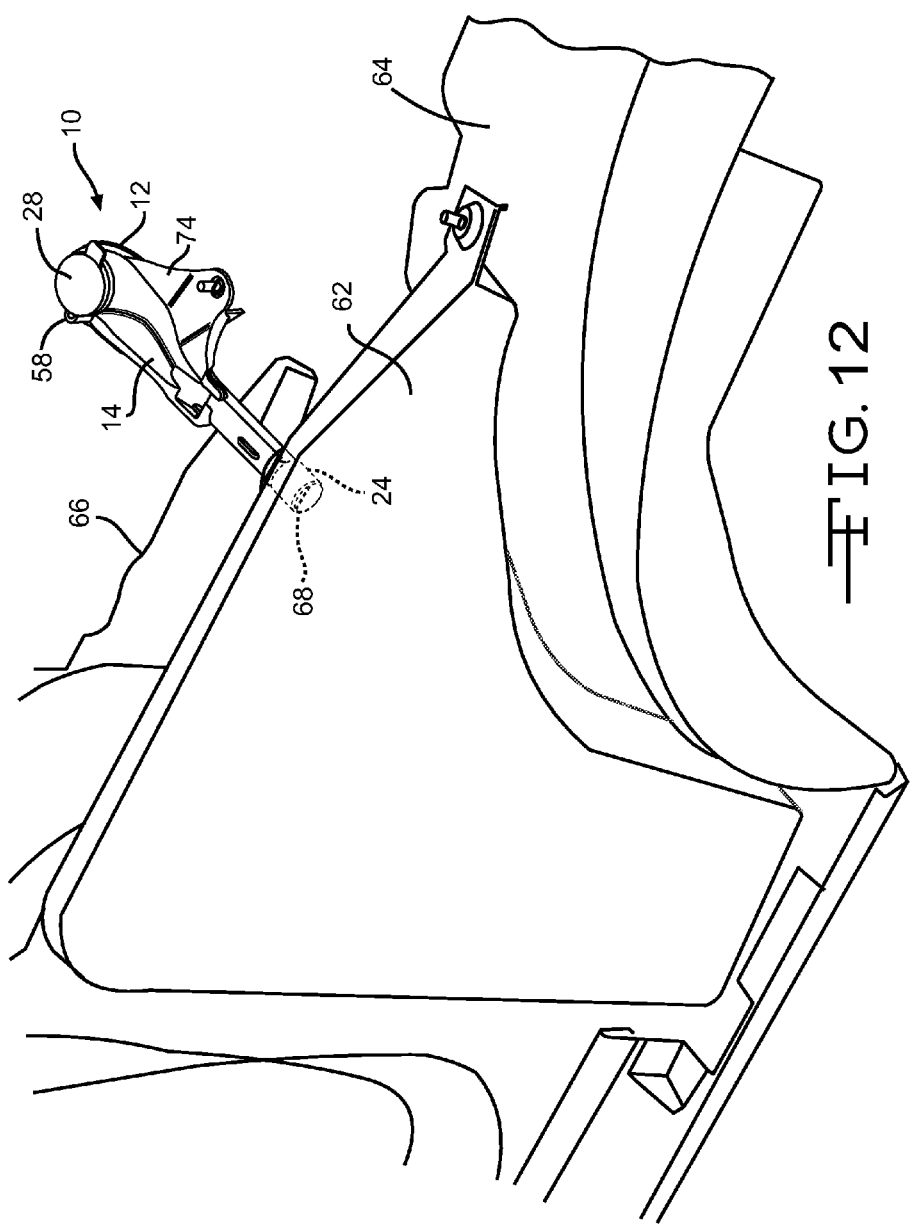
FIG. 12 is a top perspective view of the filler neck positioned adjacent to an automotive fluid container.

Referring to FIGS. 4, 5 and 12, the filler neck 10 is used with an automotive fluid container 62, such as a washer fluid container, that is positioned adjacent to a fender 64 and an engine compartment 66. In an embodiment, as shown in FIGS. 4 and 5, the second end 24 of the body 12 is configured and adapted for insertion through a round orifice 68 positioned on the upper side of the container 62. In this regard, the second end 24 has a substantially round configuration to correspond to the shape of the orifice 68. Further, the second end 24 is formed to be seamless to provide a smooth exterior surface 70. In an embodiment, the second end 24 includes a chamfered edge 72. As it will be appreciated, the configuration of the second end 24 allows for ease of installation, especially for situations in which the installer must blindly insert the second end 24 in the orifice 68. Further, the configuration of the second end 24 provides a seal between the second end 24 and the orifice 68 to prevent fluid leakage from the container 62. The body 12 has a flange 74 for mounting the filler neck 10 during installation. After installation, the filler neck 10 extends into the engine compartment 66 to allow for access to the opening 26 and the cap 28.

To fill the container 62 using the filler neck 10, the cap 28 is removed from the opening 26. Fluid, such as washer fluid, is poured through the opening 26 into the reservoir 30 in a manner not to exceed the fill limit section 36. The fluid then flows through the fluid passageway 32 and into the container 62 through the open second end 24. During filling, the reservoir 30 and the fluid passageway 32 regulate the flow of fluid through the body 12 as described above. Displaced air from the container 62 flows through the open second end 24 into the air passageway 42. The air then flows through the air channel 48 and escapes through the exhaust port 50 as described above. The filling process is completed when the fluid level in the reservoir 30 reaches the fill limit section 36 and no more fluid flows into the container 62. The cap 28 is then placed over the opening 26.

While the invention has been described with reference to particular embodiments, it should be understood that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiments, but that the invention shall include all embodiments falling within the scope of the claims.

The invention claimed is:

1. A filler neck for use with an automotive fluid container comprising:
   a body defined by a top and a second end, said top having an opening adapted for receipt of fluid, said second end adapted for connection to said fluid container, said body having a tubular shaped member formed from said second end to a first segment, said body forming a fluid passageway allowing fluid to flow through said body and into said fluid container;
   an air passageway positioned above said fluid passageway inside said tubular shaped member, said air passageway extending from said second end to said first segment, said air passageway separated from said fluid passageway by a dividing wall positioned along a length of said tubular shaped member;
   an air channel formed outside said fluid passageway and coupled to said air passageway; said first segment being a first air channel segment; said air channel positioned perpendicular to said air passageway at said first air channel segment, a second air channel segment positioned parallel to said fluid passageway and coupled to said first air channel segment, and a third air channel segment coupled to said second channel segment terminating in an exhaust port positioned adjacent said opening, said second segment extends upwardly along the top of the body from the first segment toward the third segment.

2. The filler neck of claim 1, including a movable cap positioned adjacent to the opening.

3. The filler neck of claim 1, including a reservoir formed between said opening of said body and said tubular shaped member wherein the reservoir and the fluid passageway are configured to allow for a predetermined rate of fluid flow.

4. The filler neck of claim 3, wherein the predetermined rate is about 3.785 liters/minute.

5. The filler neck of claim 3, wherein the reservoir is larger than the fluid passageway.

6. The filler neck of claim 1, wherein the fluid passageway and the air passageway have generally semi-circular cross sections.

7. The filler neck of claim 1 wherein the tubular shaped member at the second end of said body is configured for insertion in an orifice of the container.

8. The filler neck of claim 1, wherein the tubular shaped member at the second end of said body has a chamfered edge.

9. The filler neck of claim 1, wherein the body has a flange for mounting the filler neck.

10. The filler neck of claim 1, wherein the body is made of a plastic material.

11. The filler neck of claim 10, wherein the plastic material is polypropylene.

* * * * *